United States Patent
Bird

(10) Patent No.: US 8,052,351 B2
(45) Date of Patent: Nov. 8, 2011

(54) APPARATUS FOR CONNECTING A CONNECTOR PIPE TO A PIPELINE

(75) Inventor: William Tobias Bird, Hafrsfjord (NO)

(73) Assignee: Subsea 7 Norway NUF, Grimstad (NO)

( * ) Notice: Subject to any disclaimer, the term of this patent is extended or adjusted under 35 U.S.C. 154(b) by 577 days.

(21) Appl. No.: 12/069,191

(22) Filed: Feb. 7, 2008

(65) Prior Publication Data

US 2008/0205990 A1  Aug. 28, 2008

(30) Foreign Application Priority Data

Feb. 9, 2007  (GB) .................................... 0702550.5

(51) Int. Cl.
*F16L 1/26* (2006.01)
*F16L 3/01* (2006.01)
*E21B 41/04* (2006.01)

(52) U.S. Cl. ..................... 405/184.4; 405/170; 166/341; 137/317

(58) Field of Classification Search .................. 405/169, 405/170, 184.1, 184.4; 166/338, 341, 342, 166/55; 137/315.01, 317, 318
See application file for complete search history.

(56) References Cited

U.S. PATENT DOCUMENTS

| | | | | |
|---|---|---|---|---|
| 3,166,123 A | * | 1/1965 | Watkins ........................ 166/349 |
| 4,030,309 A | * | 6/1977 | Mason .......................... 405/190 |
| 4,203,687 A | * | 5/1980 | Sumner ......................... 405/170 |
| 4,234,268 A | * | 11/1980 | Scodino ........................ 405/158 |
| 4,515,101 A | * | 5/1985 | Akerblom ..................... 114/162 |
| 4,832,530 A | * | 5/1989 | Andersen et al. ............. 405/170 |
| 5,458,439 A | * | 10/1995 | Hall et al. ..................... 405/158 |
| 5,593,249 A | * | 1/1997 | Cox et al. ..................... 405/191 |
| 6,234,717 B1 | * | 5/2001 | Corbetta ....................... 405/170 |

FOREIGN PATENT DOCUMENTS

| | | |
|---|---|---|
| GB | 2304394 | 3/1997 |
| GB | 2323907 | 10/1998 |
| WO | WO 2006/005994 | 1/2006 |

* cited by examiner

*Primary Examiner* — Tara Mayo-Pinnock
(74) *Attorney, Agent, or Firm* — Levy & Grandinetti

(57) ABSTRACT

A method is disclosed that comprises the steps of preassembling the connector pipe in a support; coupling a frame to the pipeline at or towards an end thereof such that the location of at least one part of the frame is known with reference to the throughbore and the end of the pipeline; engaging the support with a portion of the frame; substantially aligning the connector pipe with the end of the pipeline; and connecting the connector pipe to the end of the pipeline. A cutting tool is also disclosed that can be coupled to a portion of a guide means and used to cut the pipeline at a predetermined distance from the guide means such that the end of the pipeline is created. A remotely operable vehicle can be used to remotely actuate and control the connection of the pipe and the pipeline.

5 Claims, 11 Drawing Sheets

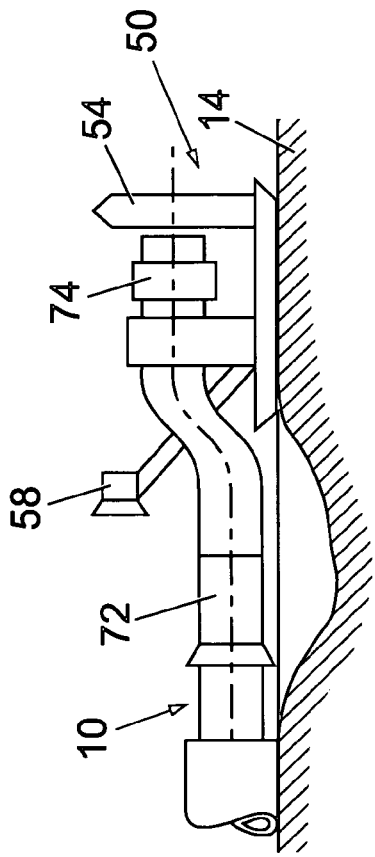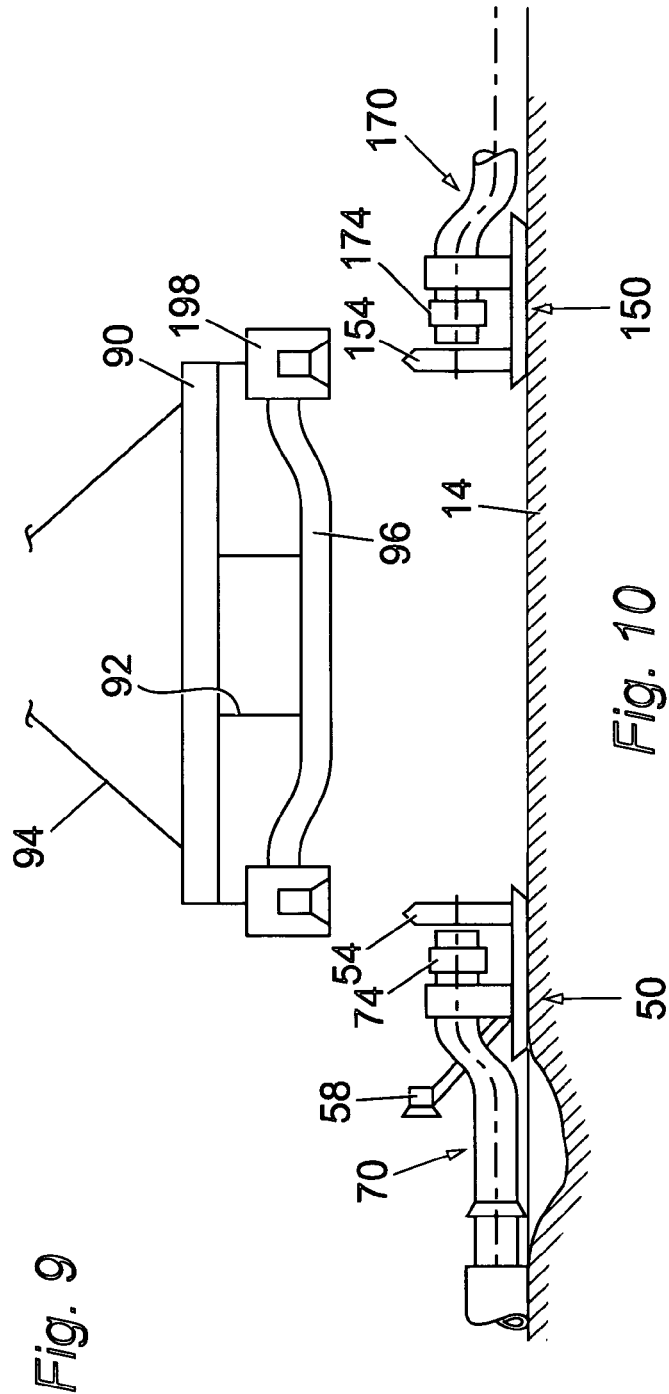

APPARATUS FOR CONNECTING A CONNECTOR PIPE TO A PIPELINE

FIELD OF THE INVENTION

The present invention relates to a method and apparatus for connecting a connector pipe to a pipeline. In particular, but not exclusively, the invention provides a method and apparatus for removing part of a pipeline and replacing that part of the pipeline with a spool piece. The method and apparatus is also suitable for connecting an end of an existing pipeline to a new pipeline, such as a riser.

BACKGROUND TO THE INVENTION

There are existing methods for replacing part of a pipeline with a spool piece. For instance, the pipeline is cut at two axially spaced locations and the portion of pipeline between the cuts is removed. Towards each cut end, the pipeline is raised to a particular height relative to the seabed. A connector pipe is lowered in a frame onto the seabed adjacent each cut end and the frame is set at a predetermined height relative to the seabed so that the connector pipe is at a similar height to the pipeline. The pipe and the pipeline can then be connected. However, since the seabed is not uniform, natural variations in height and inclination can result in misalignments and complications in achieving the connection of the connector pipe to the existing pipeline.

SUMMARY OF THE INVENTION

According to a first aspect of the invention, there is provided a method of connecting a connector pipe to a pipeline having a throughbore, the method comprising the steps of:

(a) preassembling the connector pipe in a support;
(b) coupling a frame to the pipeline at or towards an end thereof such that the location of the frame is known with reference to the throughbore and the end of the pipeline;
(c) engaging the support with a portion of the frame;
(d) substantially aligning the connector pipe with the end of the pipeline; and
(e) connecting the connector pipe to the end of the pipeline.

The method is advantageous since steps (a) to (c) enable the location of the connector pipe to be readily established relative to the bore and the end of the pipeline. Thus, the dimensions of the frame and the support relative to the pipeline, and each other can be calculated prior to the connection operation to facilitate alignment and connection of the connector pipe with the pipeline.

Method steps and apparatus described with reference to the second aspect of the invention can also be used in combination with the first aspect of the invention where appropriate.

According to a second aspect of the invention, there is provided a method of connecting a connector pipe to a pipeline having a throughbore, the method comprising the steps of:

(a) preassembling the connector pipe in a support;
(b) locating a guide means at a known position relative to the throughbore of the pipeline;
(c) coupling a cutting tool to a portion of the guide means;
(d) cutting the pipeline at a predetermined distance from the guide means such that an end of the pipeline is created;
(e) coupling the support to a portion of the guide means at a known position;
(f) substantially aligning the connector pipe with the end of the pipeline; and
(g) connecting the connector pipe to the end of the pipeline.

Prior to step (b), the method can include the step of removing part of a cover surrounding the pipeline. Step (b) can include locating the guide means on a portion of the uncovered pipeline.

Prior to step (b), the method can include excavating the seabed in the region of the pipeline to be cut.

The method of step (b) can include providing a guide member attached to a clamp and clamping the guide member to the pipeline. Since the clamp is centered on the pipeline, the relative location of the guide member and the axis of the pipeline is known.

The method can include repeating steps (a) to (g) and step (b) can include locating the guide means at an axially spaced position on the pipeline. The method can include detecting the relative position of each guide means during step (b) to measure the distance between the two guide means and thereby allow calculation of the distance between the cut ends of the pipeline. This information can be used to enable a spool piece of the requisite length to be manufactured for subsequent coupling to the connector pipes once these have been connected at the ends of the pipeline.

The method of step (c) can include providing a cutting tool with a positioning member and mating the positioning member of the cutting tool with the part of the guide means, such as the guide member, to correctly locate the cutting tool.

The method can include the step of retrieving the cutting tool following step (d). The method can also include retrieving part of the guide means following step (d). This method step can include retrieving the guide member and coupling a second guide member to the clamp.

Method step (e) can include indirectly coupling the support to a portion of the guide means.

Method step (e) can include engaging a frame with a portion of the guide means, such as the second guide member, and thereby locating the frame at a known position relative to the throughbore and the end of the pipeline.

Following step (e) the method can further include gripping the pipeline and adjusting the height of the pipeline. This can be achieved by clamping the frame around the pipeline, supporting the frame and providing the frame with an actuation means for adjusting the height.

The step (e) can further include coupling the support with a portion of the frame. This method step can include providing the frame and the support with a cooperative positioning means and connecting the support and the frame using the cooperative positioning means.

The method step (f) can include the step of actuating at least part of the support or the frame to correctly orient the connector pipe relative to the pipeline. The method can include the step of pivoting the positioning means of the frame to manoeuvre the connector pipe relative to the pipeline.

The method can include remotely connecting the pipe to the pipeline, using a remotely operable vehicle to actuate and control steps (b) to (g).

Step (g) can include actuating movement of at least part of the support to move the connector pipe towards the pipeline.

According to the second aspect of the invention, there is provided an apparatus for connecting a connector pipe to a pipeline having a throughbore, the apparatus comprising:

a support for accommodating the connector pipe;
a guide means for coupling to the pipeline at a known location relative to the throughbore;
a cutting tool arranged to be releasably coupled to the guide means;
wherein the support and the guide means are each provided with a positioning means for interconnection of the support and the guide means to thereby orient the connector pipe at a known position relative to the throughbore and the end of the pipeline; and an actuator to facilitate connection of the connector pipe and the pipeline.

The guide means can comprise a clamp and a guide member. The cutting tool can have a positioning member arranged for releasable coupling with the guide member such that the cutting tool is operable to cut the pipeline at a known position relative to the guide means.

The guide means can be provided with a detection means, such as a transponder for detecting the relative location of another transponder. The other transponder can be provided on a further guide means located at an axially spaced location on the pipeline.

The support and the guide means can be indirectly connectable using the positioning means.

The guide means can also comprise a second guide member. Both of the guide members can be releasably connectable to the clamp. The two guide members can be interchangeably connectable to the clamp. The second guide member can be provided with a positioning member cooperable with a frame.

The frame and the support can each be provided with a cooperative positioning means so that the support is engageable with the frame.

The frame positioning means can be pivotable for substantially aligning the pipe and the pipeline.

The frame can be provided with a clamp for gripping the pipeline and an actuation means for adjusting the height of the clamp.

The actuator can comprise a remotely operable vehicle for remotely actuating and controlling the connection of the pipe and the pipeline.

The frame can be a pipe handling frame. The support can be a mudmat. One end of the pipe can have a connector for connecting the pipe to the pipeline and one end of the pipe can be provided with a connector for coupling the pipe to an end of a spool piece.

BRIEF DESCRIPTION OF THE INVENTION

Embodiments of the present invention will now be described by way of example only and with reference to and as shown in the accompanying drawings in which:

FIG. 9 is a part-side, part-sectional of the pipe and pipeline of FIG. 8 with the pipe handling frame and the guide means removed;

FIG. 10 is a part-side, part-sectional view of the pipeline and pipe of FIG. 9 with a similar pipe in opposing relation and a spool piece connected to a spool frame;

DETAILED DESCRIPTION OF PREFERRED EMBODIMENTS

Figure 1:
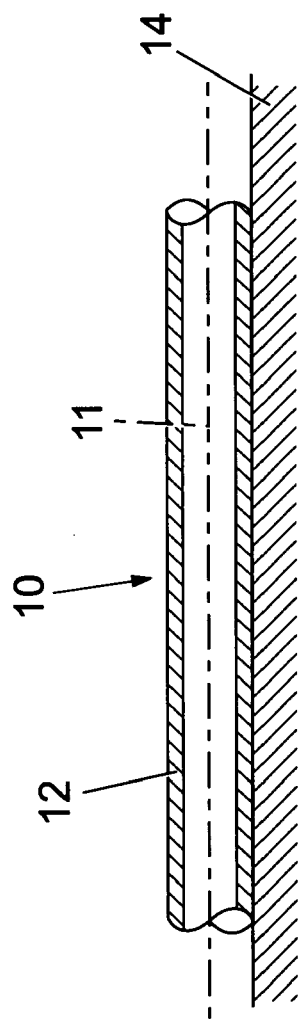
FIG. 1 is a sectional view of part of a pipeline for connection to a connector pipe according to a first embodiment of the invention.

FIG. 1 shows part of a subsea pipeline 10 laid along a seabed 14. The pipeline 10 has a throughbore and a longitudinal axis 11. An outer concrete cover 12 surrounds the pipeline 10 to ensure that the pipeline 10 is negatively buoyant so that the pipeline 10 remains on the seabed 14 when the pipeline 10 is devoid of contents. According to the first embodiment, the pipeline 10 has a length, which, due to any number of reasons, is required to be replaced. The method steps of the pipeline 10 replacement operation will be described hereinafter, following the description of components shown in FIGS. 1, 3, 4, 6 and 10.

Figure 3:
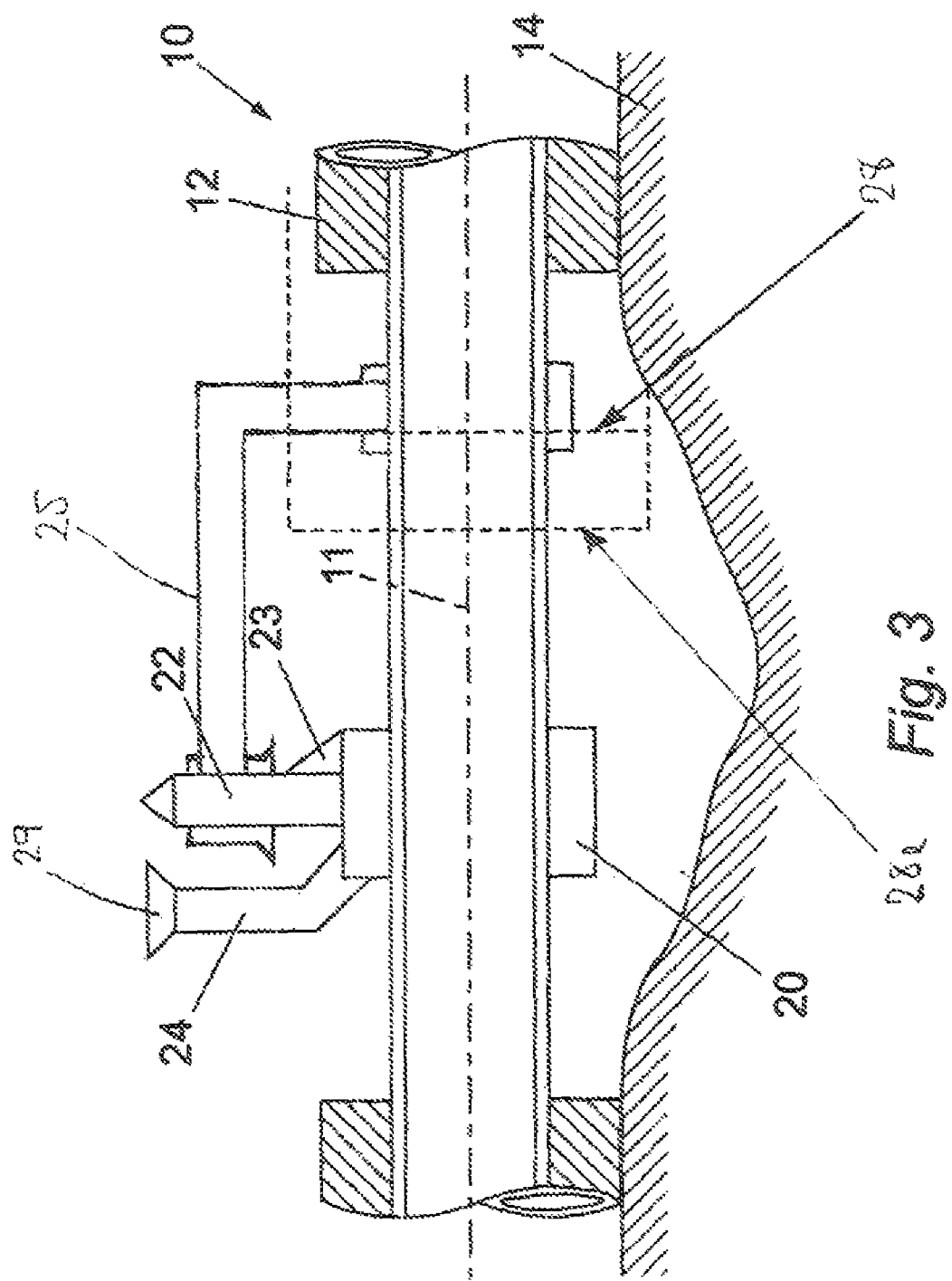
FIG. 3 is a part-side, part-sectional view of the pipeline of FIG. 2 with a guide means attached thereto.

FIG. 3 shows a clamp 20, a guide attachment 23 and a short guide post 22. The clamp 20 has two semi-annular jaws that are pivotably attached to one another at one end and separable at the other end to enable the clamp 20 to be assembled and disassembled over the pipeline 10. The clamp 20 provides a fixed reference point around the central axis 11 of the pipeline 10 for metrology, the cutting operation and (indirectly) the connecting operation.

The guide attachment 23 couples the removable short guide post 22 to the clamp 20. The clamp 20 is provided with an acoustic metrology transponder in a mounting 24. The transponder is arranged to communicate with a similar transponder (not shown) provided on a similar clamp (not shown) at an axially spaced location along the pipeline 10, as will be described hereinafter.

Figure 4:
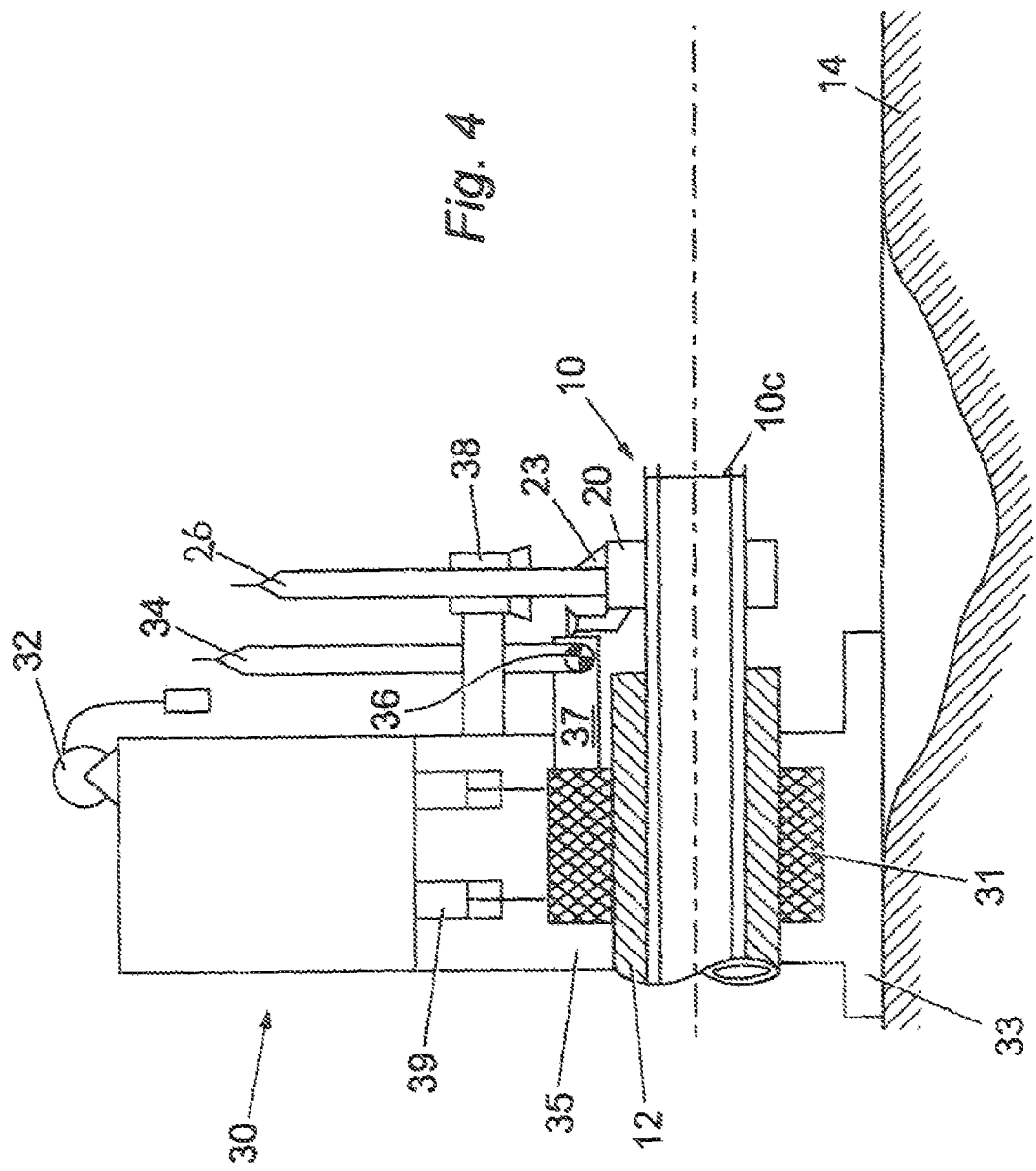
FIG. 4 is a part-side, part-sectional view of the apparatus of FIG. 3 with a pipe-handling frame attached thereto.

FIG. 4 shows the clamp 20 with the guide attachment 23 coupled to a longer guide post 26. A pipe handling frame shown generally at 30 in FIG. 4 has a female positioning member 38 that is cooperable with the long guide post 26 in order that the pipe handling frame 30 is correctly positioned relative to the clamp 20. The pipe handling frame 30 has planar feet 33 that are adapted to contact the seabed 14 in use and support the pipe handling frame 30 in a substantially upright position. Legs 35 extend perpendicular from the feet 33. The pipe handling frame 30 further comprises a frame clamp 31 located between the legs 35. The frame clamp 31 has two semi-annular jaws adapted to clamp around the pipeline 10 and concrete cover 12 in a similar manner to the clamp 20. The frame 30 also has pistons 39 attached to the frame clamp 31. The pistons 39 are actuable to control the height of the clamp 31 relative to the feet 33. An upper portion of the pipe handling frame 30 is also provided with a winch 32. A strut 37 extends parallel with the pipeline axis 11 from the frame clamp 31. The strut 37 carries a guide post 34 pivotally attached at a pivot point 36.

Figure 6:
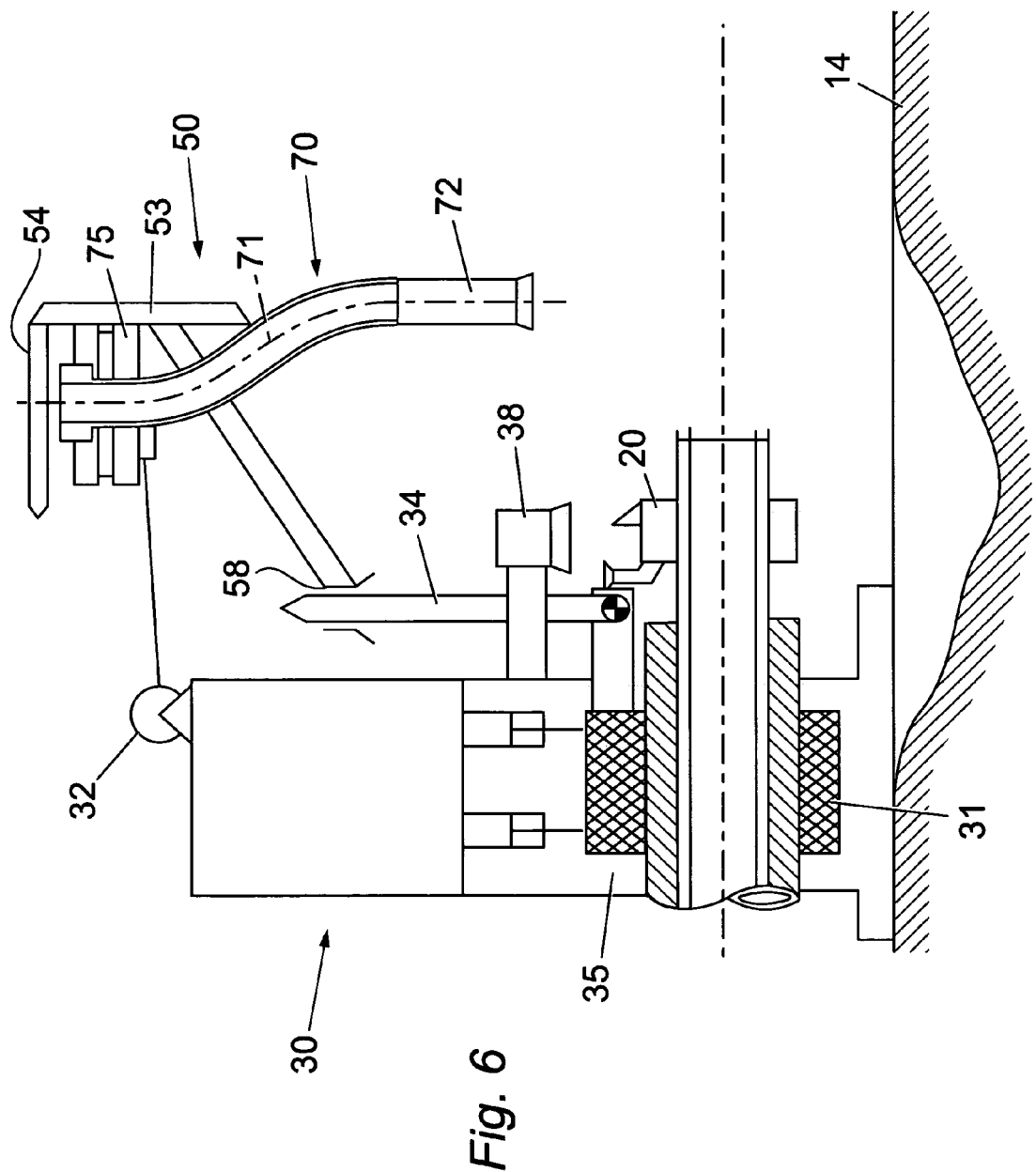
FIG. 6 is part-side, part-sectional view of the apparatus of FIG. 5 and a support carrying a pipe.

FIG. 6 shows a support in the form of a mudmat 50 having feet 53. The mudmat 50 has a support guide post 54 extending perpendicular to the feet 53 and a female positioning arm 58 angled away from the feet 53. The positioning arm 58 of the mudmat 50 is cooperable with guide post 34 of the handling frame 30.

A support 75 is fixed to the mudmat 50 perpendicular to the feet 53. The support 75 carries a connecting pipe 70 having a throughbore with an axis 71, one end of which is offset from the other. One end of the connector pipe 70 is provided with an end connector 72 and another end of the connector pipe 70 has a hub 74. The end connector 72 is a Morgrip™ connector that permits axial movement of the connector 72 over the pipeline 10 in one direction and once connected is adapted to substantially restrict removal of the end connector 72 from the pipeline 10 and to provide a fluid tight, pressure retaining seal. Morgrip® is a registered trademark of Delaware Capital Formation, Inc. for joint connectors for pipes.

A similar connecting pipe 170 and mudmat 150 are shown in FIG. 10, attached to another axially spaced cut end of the pipeline 10. Like components are marked with a similar reference numeral having a prefix "1". FIG. 10 also shows a spool piece 96 that serves as the conduit for replacing part of the pipeline 10 that has been removed. The spool piece 96 is coupled to a spool lifting frame 90 by means of ties 92. The spool lifting frame 90 is manoeuvred by supports 94 coupled to a surface vessel (not shown). The spool piece 96 has a hub 98, 198 at each end for respective connection with the hubs 74, 174 of the connector pipes 70, 170.

Equipment such as the pipe handling frame 30 and the frame guide post 34, as well as the connection between the frame guide post 34 and the positioning arm 58 of the mudmat 50 is calibrated such that the end connector 72 can be accurately aligned with a cut end 10c of the pipeline 10. This can be achieved since the distance between the guide post 22 and the plane of the cut section 28 is predetermined.

Figure 2:
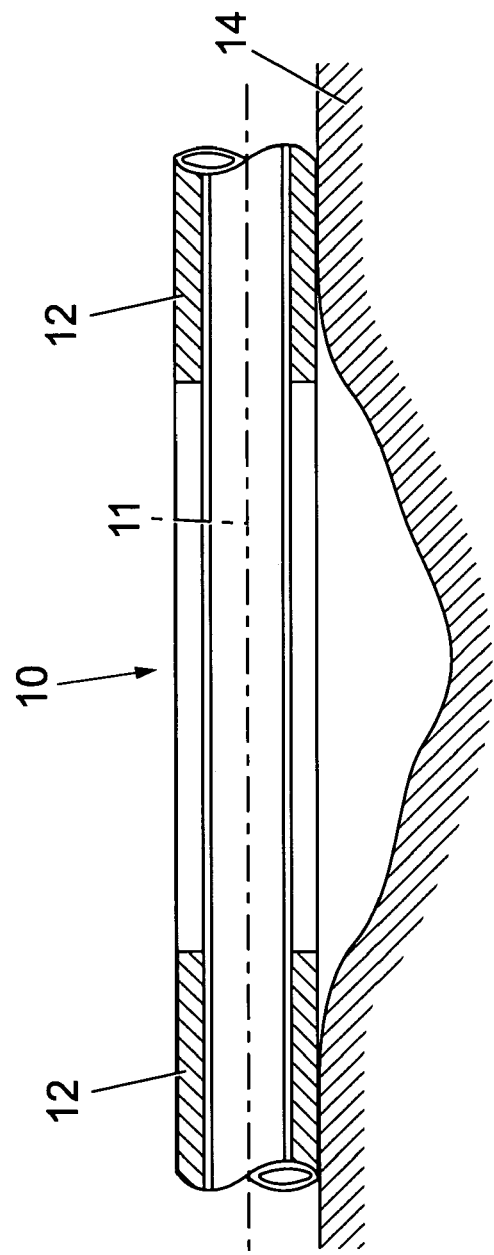
FIG. 2 is a sectional view of the pipeline of FIG. 1 with part of a cover removed.

According to the first embodiment, part of the pipeline 10 is required to be replaced with the spool piece 96. It is intended that the replacement operation is achieved without the use of subsea divers. As shown in FIG. 2, the seabed 14 is excavated beneath part of the pipeline 10. A portion of the concrete cover 12 is separated from the pipeline 10 using high pressure water jets or similar tools known in the art. If using the method on a seamed pipeline 10, the longitudinal weld seam (not shown) is removed from a length of the pipeline 10 in the region that is to be cut, in order to ensure that the outer surface of the pipeline is substantially circular in section. This prepares the pipeline 10 for the cutting and connecting operation. This excavation of the seabed 14 and removal of part of the cover 12 are procedures that are repeated at an axially spaced location (not shown) along the pipeline 10.

The jaws of the clamp 20 are positioned around the portion of pipeline 10 where the concrete cover 12 and weld seam has been removed such that the short removable guide post 22 is extending substantially perpendicular to the pipeline axis 11. The clamp 20 is secured in this position around the pipeline 10 by a remotely operated vehicle (ROV). This procedure is also repeated at the axially spaced location along the pipeline 10 where the cover 12 has been removed. The acoustic metrology transponder in the mounting 24 communicates with a similar transponder associated with the guide means at the axially spaced location to accurately determine the distance therebetween. The required length of the spool piece 96 can be calculated using the measured distance between the transponders and the known reach of the cutting tool from the transponder mounting 24.

A cutting tool (not shown) is suitably modified to include a female connecting member that is arranged to mate with the short guide post 22 of the clamp 20. The cutting tool is landed on the pipeline 10 and secured at a set position on the short guide post 22 and also to the pipeline 10, together with other factors such as the required end-to-end configuration of the spool piece 96.

All previous operational steps may be carried out while production continues, i.e. while the pipeline 10 remains in use. However, prior to the cutting step, the pipeline 10 must be isolated. If the pipeline is carrying hydrocarbons, the contents of the pipeline 10 must be removed and isolated before the cutting operation can commence. The geometry of the cut is calculated such that there is a sufficient length of pipeline 10 between the clamp 20 and the end 10c of the pipeline 10 to accommodate the end connector 72 attached to the connector pipe 70. A dashed line 28e (FIG. 3) shows the expected location of the end connector 72 once the connection of the connector pipe 70 to the pipeline 10 is complete. The cutting tool is then actuated in order to cut the pipeline 10 at section 28, which is a known distance from the guide post 22. The cut end 10c of the pipeline 10 is thereby created.

Figure 5:
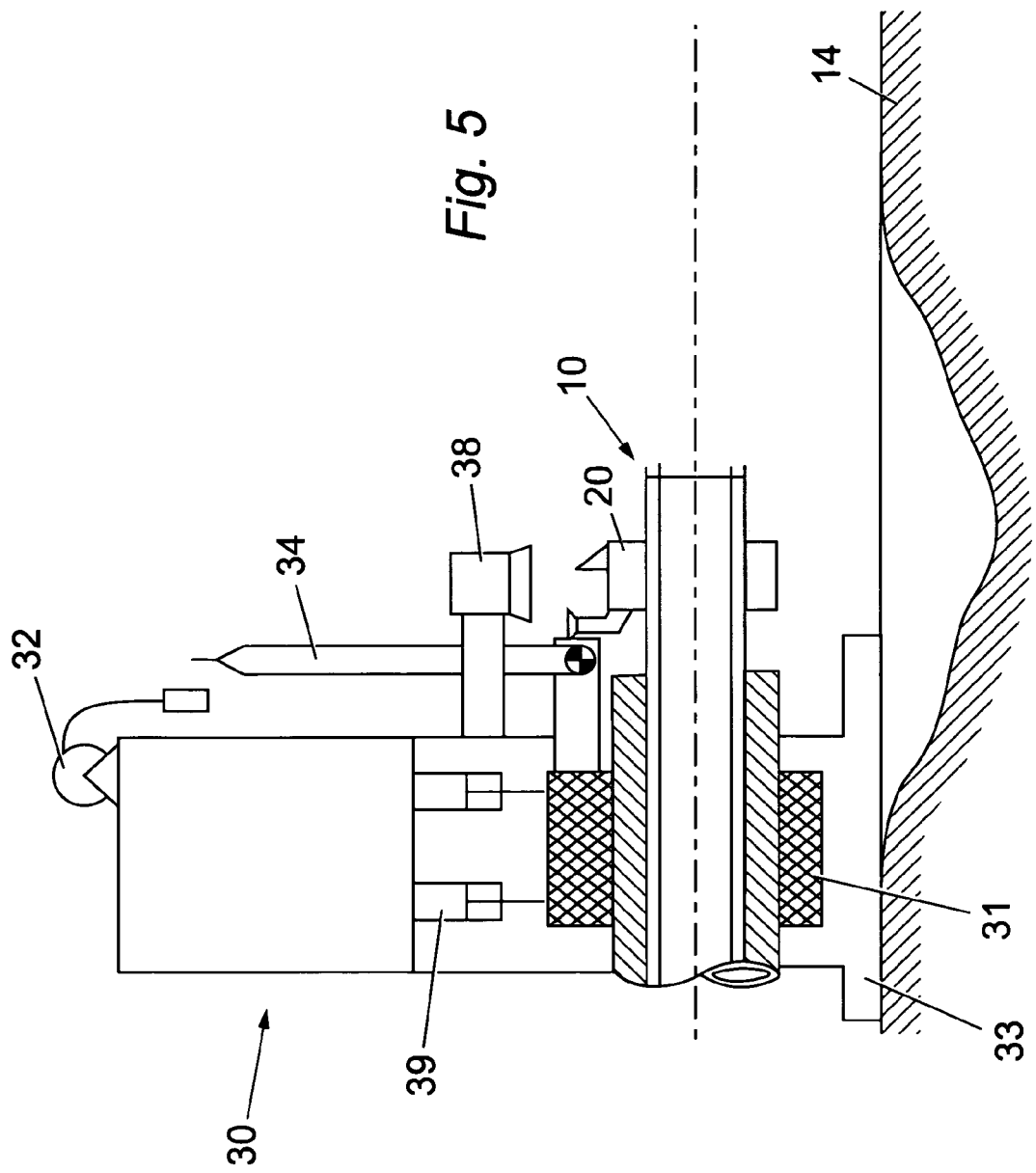
FIG. 5 is a part-side, part-sectional view of the apparatus of FIG. 4 with a guide member removed.

Once the cutting tool has performed the cutting operation, the cutting tool is removed from the short guide post 22, which is also disconnected and then retrieved from the guide attachment 23. The long guide post 26 is then attached to the clamp 20 via the guide attachment 23. The long guide post 26 is provided to correctly orient the pipe handling frame 30 with reference to the clamp 20. Thus the guide member 38 of the pipe handling frame 30 is landed on the guide post 26. The pipe handling frame 30 is supported on the seabed 14 by the feet 33. The jaws of the frame clamp 31 are closed around the concrete cover 12 of the pipeline 10 to secure the pipe handling frame 30 in position and grip the pipeline 10. The hydraulic pistons 39 of the pipe handling frame 30 are actuated by the ROV to raise the pipeline 10 above the seabed 14, as shown in FIG. 4. The force exerted by the pistons 39 in raising the pipeline 10 is reacted out through the feet 33 on the seabed 14. The long guide post 26 is then be removed from the guide attachment 23 as shown in FIG. 5.

The positioning arm 58 of the mudmat 50 is landed on the frame guide post 34 and locates the mudmat 50 at the correct pre-determined position as shown in FIG. 6. At this point the ROV engages the winch 32 of the pipe handling frame 30 with a part of the mudmat 50. The ROV then actuates the winch 32 to lower the mudmat 50 in a controlled manner as the frame guide post 34 pivots about the pivot point 36, until the frame guide post 34 is oriented substantially parallel to the pipeline 10. This aligns the axis 11 of the pipeline 10 and the axis 71 of the end connector 72.

Figure 7:
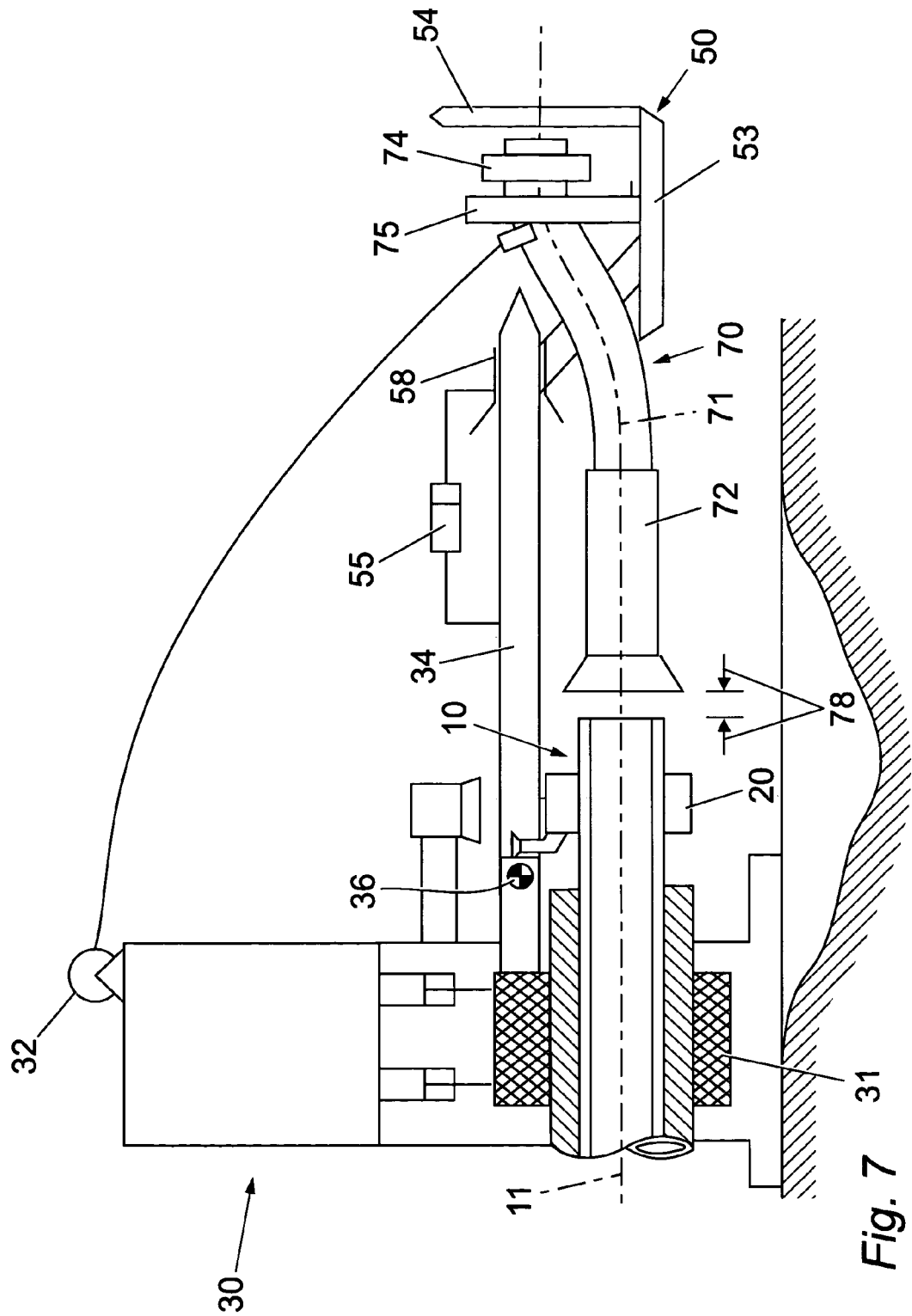
FIG. 7 is a part-side, part-sectional view of the apparatus of FIG. 6 with the pipeline and pipe having aligned bores.

The distances between the various guide posts 26, 34 are previously calculated such that there is a clearance (denoted by arrows 78 in FIG. 7) between the cut end 10c of the pipeline 10 and the end connector 72 of the pipe 70.

Figure 8:
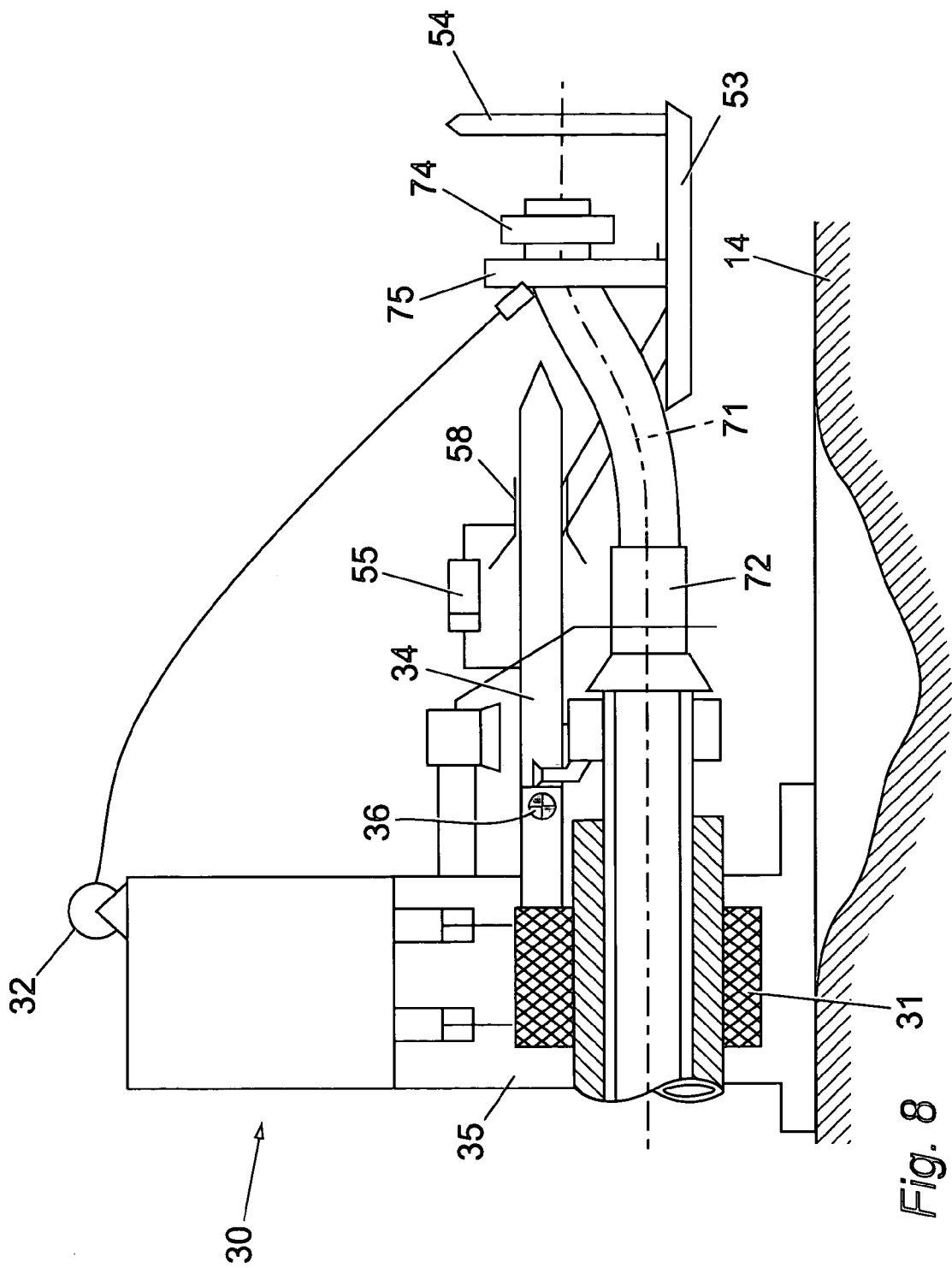
FIG. 8 is a part-side, part-sectional view of the apparatus of FIG. 7 with the pipe and pipeline in their connected configuration.

The ROV then engages a piston 55 in fluid communication with the positioning arm 58 of the mudmat 50 and the frame guide post 34. The ROV actuates the piston 55 to move the positioning arm 58 in an axial direction towards the pipeline 10 such that the end connector 72 locates over the cut end 10c of the pipeline 10. The pipe 70 is moved a distance shown by an arrow 79 in FIG. 8.

The pipe handling frame 30 is recovered to surface following connection of the connector pipe 70 with the pipeline 10. The clamp 20 is also removed from the pipeline 10 and recovered to surface as illustrated in FIG. 9.

Similarly, the connecting pipe 170 is connected to the other cut end of the pipeline 10 as shown in FIG. 10. The spool piece 96 (attached to the spool lifting frame 90) is suspended from the surface vessel, and the spool lifting frame 90 is manoeuvred to locate the spool piece 96 in the region of the connector pipes 70, 170. The spool piece 96 is guided by the ROV, such that an end region 98 of the spool piece 96 engages the guide post 54 of the mudmat 50 and an end region 198 of the spool piece 96 engages the guide post 154 of the mudmat 150 to correctly position the spool piece 96 relative to the hubs 74, 174. The connections between the hubs 74, 174 and the ends 98, 198 of the spool piece 96 are then made up by the ROV to provide a continuous throughbore between the separated parts of the pipeline 10.

A Morgrip® end connector 72 was used to seal the connecting pipe 70 to the pipeline 10 in the first embodiment. However, any other suitable end connector 72 can be used to effect the connection between the connector pipe 70 and the pipeline 10. Other suitable end connectors include Vetco JSS/PSS PLET and Flexconnect™.

Figure 11:
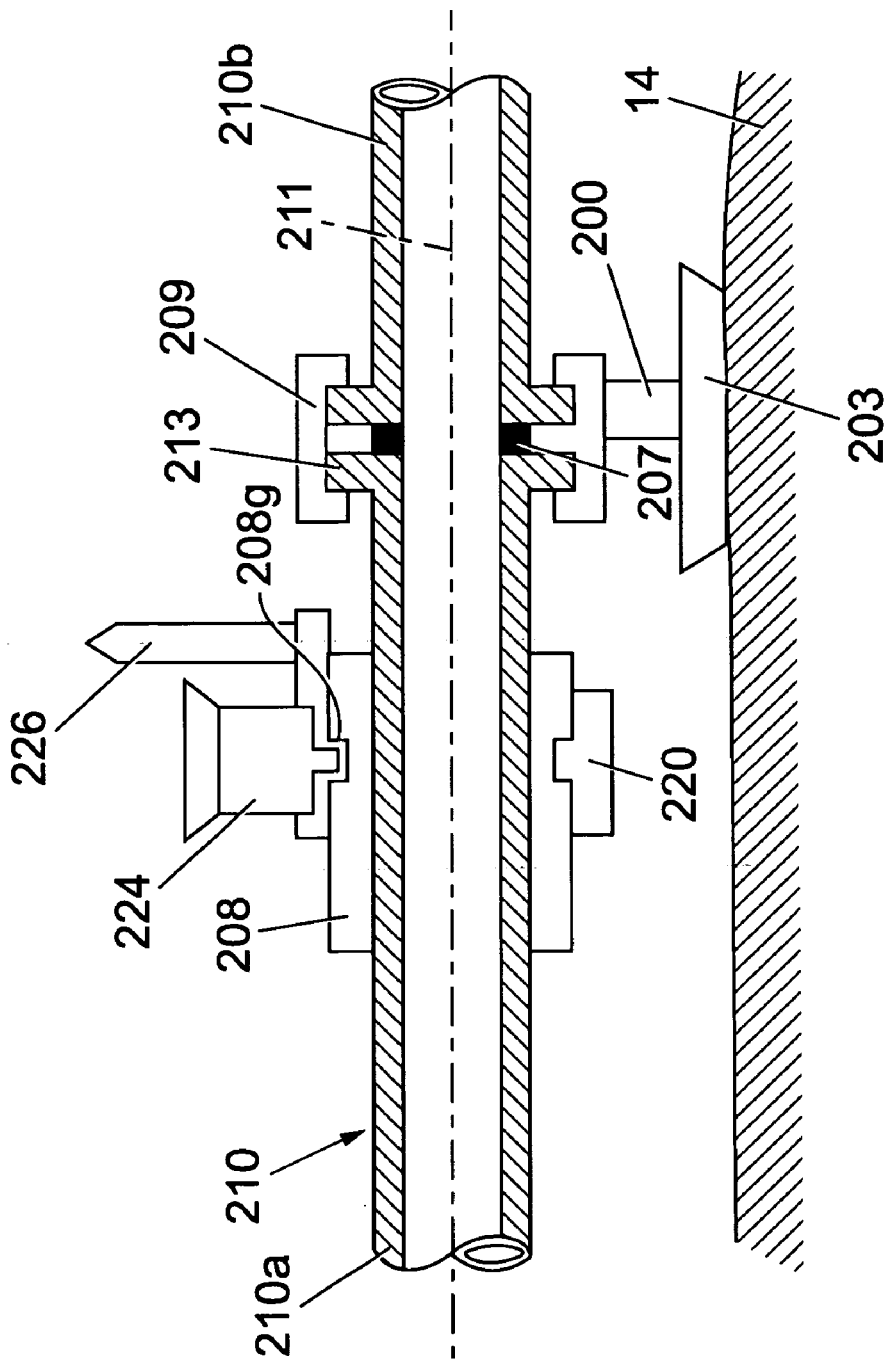
FIG. 11 is a part-side, part-sectional view of another pipeline, with a guide means attached thereto, for connection to a connector pipe according to a second embodiment of the invention.
Figure 12:
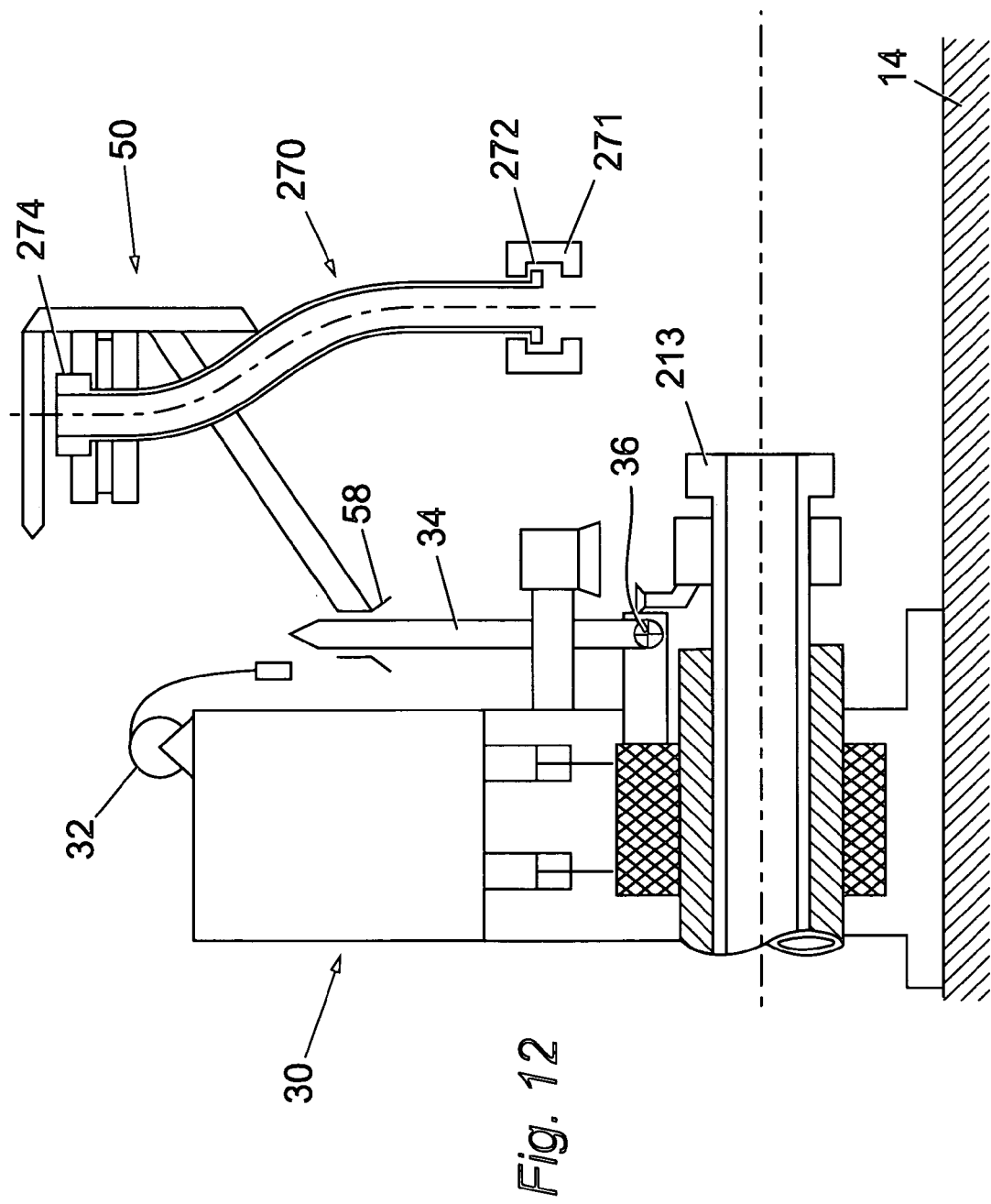
FIG. 12 is a part-side, part-sectional view of the apparatus of FIG. 11 with a frame and a support carrying the connector pipe.
Figure 13:
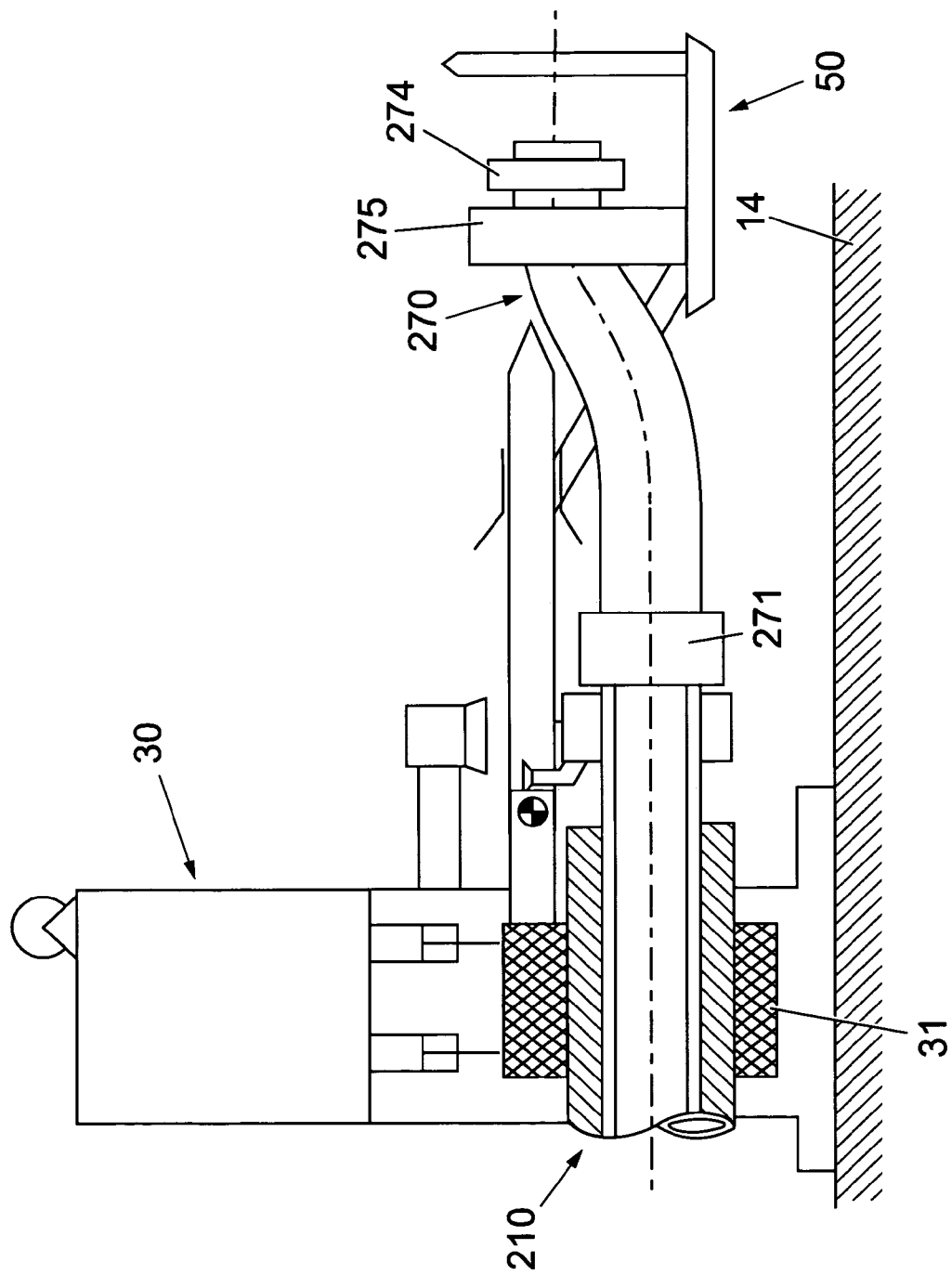
FIG. 13 is a part-side, part-sectional view of the apparatus of FIG. 12 with the pipe and pipeline in their connected configuration.

A second embodiment of the invention is shown in FIGS. 11 to 13, in which like components have been given similar reference numerals with the prefix "2". In accordance with the second embodiment, a new pipeline such as a riser or another type of pipeline is to be coupled to an existing pipeline and one or more portions of the existing pipeline must be removed to allow the new pipeline (not shown) to be coupled thereto.

The pipeline 210 is made up from lengths 210a, 210b of pipe coupled to one another by means of hub-to-hub connections. Ends of each length 210a, 210b of the pipeline 210 are provided with flanges 213 that have a sealing gasket 207 therebetween and faces that align. The flanges 213 are secured in this arrangement by a collet connector 209. A clamp connector or the like can be used in place of the collet connector 209. This hub connection is supported above the seabed by a strut 200 having feet 203. The pipeline 210 has a collar 208 with a groove 208g that is a known distance from the flange 213.

The clamp 220 is assembled around the collar 208 and the mounting 224 for the transponder locates in the groove 208g. The transponder detects the distance to the end of the new pipeline, which is to be coupled with the pipeline 210. The required length of the spool piece 96 can then be determined.

The method is similar to that described with reference to the first embodiment and involves: isolation of the pipeline 210; removal of the collet connector 209 and the pipeline length 210b; landing the pipe handling frame 30 on the guide post 226; supporting the pipeline 210 on the seabed; landing the positioning arm 58 on the frame guide post 34; and lowering and pivoting the mudmat 50 using the winch 32 and pivotable guide post 34.

FIG. 12 shows that the connector pipe 270 has a hub end connector 272 in the form of a flange having a face that corresponds to the flange 231 on the pipeline length 210a and a collect connector 271 for securing the end connector 272 to the pipeline 210. A piston connected to the positioning arm 58 of the mudmat 50 and the frame guide post 34 is actuated by the ROV to move the connector pipe 270 in an axial direction and therefore engage the connector pipe 270 with the flange 213 of the pipeline 210. The collet connector 271 is made up by the ROV to secure the hub-to-hub connection. As discussed with reference to the previous embodiment, the hub 274 at the other end of the connector pipe 270 can then be joined to the hub of a spool piece for subsequent connection to the new pipeline.

According to another embodiment, it is not essential that the winch 32 is engaged to the mudmat 50 to control movement of the mudmat 50. Rather, the pivot point 36 can be coupled to a rotary actuator (not shown) that is operated by the ROV to pivot the frame guide post 34. Alternatively, the rotary actuator and the winch 32 can be used in combination with one another to facilitate the reorientation of the mudmat 50 and align the bores of the pipeline 10 and the pipe 70.

In a further embodiment of the invention the pipeline 10, 210 can be coupled to a riser or another pipeline having an axis that is offset relative to the axis 11, 211 of the existing pipeline. Optionally, the new pipeline can be joined to a free end of the pipeline 10, 210, which would then make the cutting operation redundant and the pipe handling frame 30 can be landed directly on the guide means.

Previous systems use the seabed 14 as a reference point for connecting the connecting pipe 70 to the pipeline 10. The seabed can however be non-uniform with varying topography, and this complicates the design of the equipment needed to reliably achieve the alignment process. In contrast, the present system has a single reference point which is the axis 11 of the existing pipeline 10 to which the cutting operation, the alignment and the connection operation is calibrated. This results in a more accurate and reliable method of connecting the end connector 72 to the existing pipeline 10.

Modifications and improvements can be made without departing from the scope of the invention. For example, the cutting tool and the pipe handling frame 30 can be landed on the same guide post to omit the step of replacing the short guide post 22 for the long guide post 26.

I claim:

1. An apparatus for connecting a connector pipe to a pipeline having a throughbore, the apparatus comprising:
   a support for accommodating the connector pipe;
   a guide member for coupling to the pipeline at a known location relative to the throughbore;
   a pipe handling frame for coupling to the guide member and the pipeline;
   a cutting tool arranged to be releasably coupled to the guide member;
   wherein the support and the pipe handling frame are each provided with a positioning mechanism for interconnection of the support and the pipe handling frame to thereby orient the connector pipe at a known position relative to the throughbore and the end of the pipeline, the positioning mechanism comprising a guide post attached to the pipe handling frame and a positioning arm attached to the support and cooperable with the guide post, the guide post being pivotally connected to the pipe handling frame so that the connector pipe accommodated on the support can be oriented substantially parallel to the pipeline; and
   an actuator to facilitate connection of the connector pipe and the pipeline.

2. The apparatus according to claim 1, wherein the guide member comprises a clamp and a second guide post and the cutting tool comprises a positioning member arranged for releasable coupling with the guide member such that the cutting tool is operable to cut the pipeline at a known position relative to the guide member.

3. The apparatus according to claim 1, wherein the guide member is provided with a detection mechanism incorporating a transponder for detecting the relative location of another transponder provided on a further guide member located at an axially spaced location on the pipeline.

4. The apparatus according to claim 1, wherein the actuator comprises a remotely operable vehicle for remotely actuating and controlling the connection of the connector pipe and the pipeline.

5. The apparatus according to claim 1, wherein one end of the connector pipe comprises a connector for connecting the connector pipe to the pipeline and one end of the connector pipe comprises a connector for coupling the connector pipe to an end of a spool piece.

\* \* \* \* \*